United States Patent
Bardon et al.

(10) Patent No.: US 7,311,749 B2
(45) Date of Patent: Dec. 25, 2007

(54) FILTER BLOCK FOR FILTERING PARTICLES CONTAINED IN THE EXHAUST GAS OF A COMBUSTION ENGINE

(75) Inventors: Sébastien Bardon, Lyons (FR); Vincent Gleize, Saint-Saturnin les Avignon (FR)

(73) Assignee: Saint-Gobain Centre de Recherches et d'Etudes European, Courbevoie (FR)

( * ) Notice: Subject to any disclaimer, the term of this patent is extended or adjusted under 35 U.S.C. 154(b) by 41 days.

(21) Appl. No.: 11/241,932

(22) Filed: Oct. 4, 2005

(65) Prior Publication Data

US 2006/0059878 A1 Mar. 23, 2006

Related U.S. Application Data

(63) Continuation of application No. PCT/FR04/00836, filed on Apr. 2, 2004.

(30) Foreign Application Priority Data

Apr. 4, 2003 (FR) .................................. 03 04214

(51) Int. Cl.
*B01D 46/00* (2006.01)
*F01N 3/022* (2006.01)

(52) U.S. Cl. ..................... 55/523; 55/282.2; 55/282.3; 55/385.3; 55/484; 55/DIG. 10; 55/DIG. 30; 60/311

(58) Field of Classification Search ............... 55/282.2, 55/282.3, 385.3, 484, 523, DIG. 10, DIG. 30; 60/311; 428/116

See application file for complete search history.

(56) References Cited

U.S. PATENT DOCUMENTS

| | | | | | |
|---|---|---|---|---|---|
| 4,416,676 | A | * | 11/1983 | Montierth | 55/523 |
| 4,519,820 | A | * | 5/1985 | Oyobe et al. | 55/523 |
| 4,659,348 | A | * | 4/1987 | Mayer | 60/311 |
| 4,810,554 | A | * | 3/1989 | Hattori et al. | 55/523 |
| 5,171,335 | A | * | 12/1992 | Kojima et al. | 55/523 |
| 6,656,564 | B2 | * | 12/2003 | Ichikawa et al. | 55/523 |
| 6,673,414 | B2 | * | 1/2004 | Ketcham et al. | 55/523 |
| 6,902,599 | B2 | | 6/2005 | Bardon | |
| 7,056,365 | B2 | * | 6/2006 | Ichikawa et al. | 55/523 |
| 2004/0088959 | A1 | * | 5/2004 | Saito et al. | 55/523 |
| 2004/0134173 | A1 | | 7/2004 | Bardon | |

FOREIGN PATENT DOCUMENTS

| | | |
|---|---|---|
| DE | 41 37 738 | 5/1993 |
| EP | 1 217 185 | 6/2002 |
| FR | 2 823 253 | 10/2002 |

* cited by examiner

*Primary Examiner*—Jason M. Greene
(74) *Attorney, Agent, or Firm*—Young & Thompson

(57) ABSTRACT

A filter block for filtering particles contained in the exhaust gas of an internal combustion engine includes a plurality of channels for the circulation of the gas, a channel defined by a wall provided with a filtering zone and which opens out towards the outside via an opening, a group of channels including at least two channels with different respective F/P ratios between surface F of the filtering zone and surface P of the wall. One channel of the group of channels includes an opening whose surface O is larger than the surface F of the filtering zone of the channel.

23 Claims, 1 Drawing Sheet

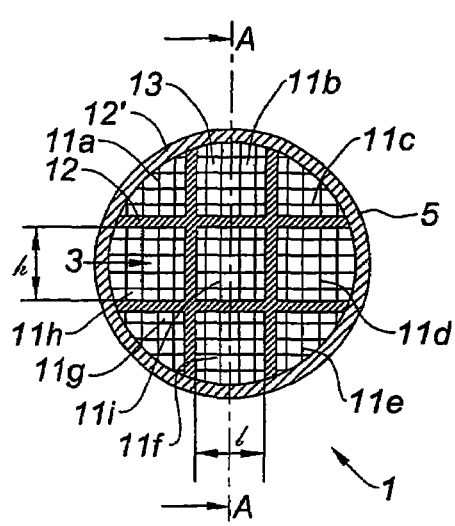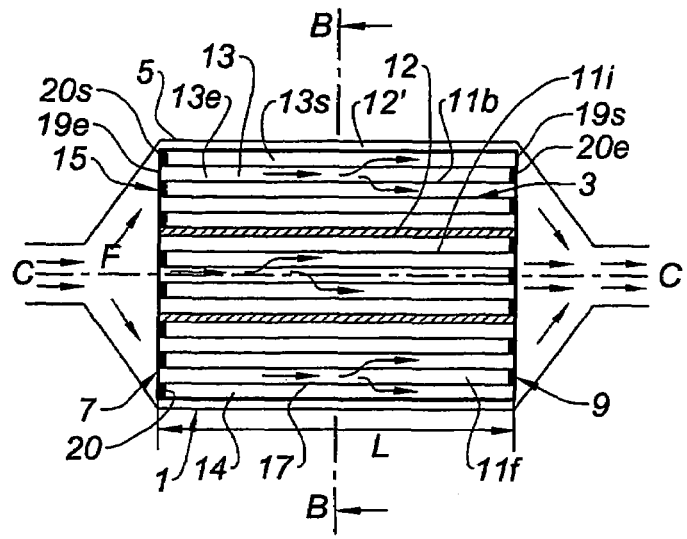
Fig. 1         Fig. 2
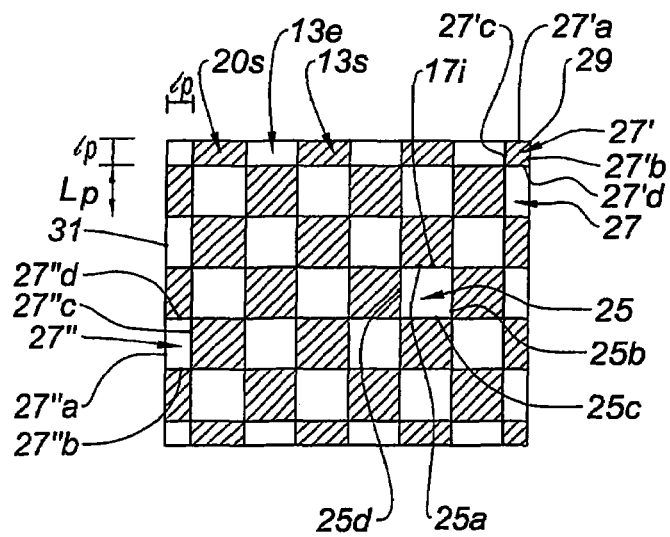
Fig. 3

FILTER BLOCK FOR FILTERING PARTICLES CONTAINED IN THE EXHAUST GAS OF A COMBUSTION ENGINE

CROSS REFERENCE TO RELATED APPLICATIONS

This application is a continuation of the international application PCT/FR2004/000836, filed on Apr. 2, 2004, which designated the United States of America, the entire contents of which are hereby incorporated by reference.

BACKGROUND OF THE INVENTION

The invention relates to a filter block and to a filter body formed by the assembly of a plurality of filter blocks, used for the filtration of particles present in the exhaust gases of an internal combustion engine, particularly of the diesel type.

Conventionally, before being released to the open air, the exhaust gases may be purified by means of a particulate filter like the one shown in FIGS. 1 and 2, known in the prior art.

A particulate filter 1 is shown in FIG. 1 in a transverse cross section, along a cutting plane B-B shown in FIG. 2, and, in FIG. 2, in a longitudinal cross section along the cutting plane A-A shown in FIG. 1.

The particulate filter 1 conventionally comprises at least one filter body 3, inserted in a metal housing 5, intended to be traversed from an upstream side 7 to a downstream side 9, by the exhaust gases.

The filter body 3 generally comprises a plurality of filter blocks 11a-11i consisting of porous honeycomb structures, conventionally made from ceramic (cordierite, silicon carbide), assembled together by bonding by means of seals 12 of ceramic cement. The seals 12, substantially gastight, are conventionally about 1 mm thick. The ceramic cement generally consists of silica and/or silicon carbide and/or aluminum nitride.

The assembly thus formed can then be machined to the desired cross section, round or ovoid for example. The filter body 3 shown in FIGS. 1 and 2 has the shape of a cylinder with an axis C-C.

Among the filter blocks, a distinction is made between the internal filter blocks 11i and the external filter blocks 11a-11h. Unlike the internal filter blocks 11i, the external filter blocks 11a-11h are adjacent to the housing 5. Conventionally, a material 12', gastight to the exhaust gases, is placed between the external filter blocks 11a-11h and the housing 5.

Conventionally, a filter block 11a-11i is substantially a rectangular parallelepiped, with length L, width l and height h. It comprises a plurality of straight, parallel channels 13, adjacent to one another, and with the same square cross section. The internal space 14 of a channel 13 is bounded by a side wall 17 terminating outwardly in an opening 19 and blocked, at the end opposite the opening 19, by a plug 20.

Two types of channels are distinguished. The inlet channels 13e comprise a plug 20e on the downstream side 9 and an opening 19e on the upstream side 7. The outlet channels 13s comprise a plug 20s on the upstream side 7 and an opening 19s on the downstream side 9.

The inlet channels 13e and outlet channels 13s are arranged alternately, in the width l and in the height h of the filter block.

As shown in FIG. 2, the exhaust gas stream F enters the filter body 3 via the openings 19e of the inlet channels 13e, passes through the side walls 17 of these channels to reach the outlet channels 13s, and escapes to the exterior via the openings 19s. The expression "filtration zone" of a side wall 17 is the area of this wall crossed by the exhaust gases.

Every passage of the gases through the filter block is accompanied by a pressure drop, mainly due to the passage of the gases through the filtration zones. It is desirable to minimize this pressure drop.

For the same gas flow rate entering the filter, the pressure drop is generally lower when the filtration zones of the channels are extended. In fact, a large filtration zone means, for an inlet channel, a large area available for the passage of the gases, and, for an outlet channel as well as an inlet channel, generally a large cross section limiting the pressure drop during the flow of the gases in the channel. However, a compromise is necessary to take account of the size, weight and cost requirements. To optimize this compromise, the filter is therefore adapted according to the pressure drop permissible in its application.

Patent application FR 0104686, filed by the Applicant, also proposes a filter body comprising a central part and a peripheral part having different channel densities and suitable for balancing the pressure drop at various points of the filter body.

Despite these improvements, a permanent need exists for solutions permitting a further reduction of the pressure drop across the filter while meeting the size requirements.

The object of the invention is to provide a filter block suitable for limiting the pressure drop resulting from the crossing of the filter by the gases.

SUMMARY OF THE INVENTION

According to the invention, this aim is achieved by means of a filter block for the filtration of particles present in the exhaust gases of an internal combustion engine, comprising a group of flow channels for said gases, each of said channels being bounded by a wall provided with a filtration zone and terminating outwardly in an opening, said group of channels comprising at least two channels of which the respective F/P ratios between the filtration zone area F and the wall area P are different. The filter block according to the invention is remarkable in that a channel of said group of channels has an opening whose area O is larger, the larger the area F of said filtration zone of said channel.

As shown in greater detail in the rest of the description, the adaptation of the opening of a channel as a function of the area of its wall used for filtration, in particular the adaptation of the openings of the peripheral channels of which the F/P ratios are different from 1, tends to make the gas velocities in the channel and in the plurality of the channels adjacent to it uniform, thereby facilitating the flow of the gases through the filter. An advantageous result thereof is a lower pressure drop.

According to other preferred features of the invention, every channel of said group is conformed so that $$0.9 * R_{threshold} < O/F < 1.1 * R_{threshold}, \quad (I)$$

and preferably so that $$O/F = R_{threshold} \quad (II)$$

where $R_{threshold}$ is a threshold value, determined for example according to the intended application of said filter block;

said group only comprises channels terminating near one another, or only inlet channels, or only outlet channels for said gases, or further comprises all the channels of said filter block;

said channels of said filter block being substantially parallel, adjacent to one another, and classifiable as "peripheral" channels and as "internal" channels according to whether they do or do not comprise, respectively, a nonfiltering zone exposed toward the outside of said filter block, the ratio $O_p/O_i$ of the area $O_p$ of the opening of a peripheral channel to the area $O_i$ of the opening of an internal channel adjacent to it is between 0.2 and 0.75. Two channels are said to be "adjacent" when they comprise a common portion of side wall, possibly in the form of a common edge. In the latter case, the portion of common side wall is limited to a contact line. Preferably, when said peripheral channel is a corner channel, that is, extending along a longitudinal edge of said filter block, the ratio $O_p/O_i$ is between 0.2 and 0.3, and further preferably is substantially equal to 0.25. Preferably, when said peripheral channel is a lateral peripheral channel, that is, is positioned along a single side of the filter block, said $O_p/O_i$ ratio is between 0.4 and 0.6, and preferably is substantially equal to 0.5;

the cross sections of said inlet and/or outlet internal channels, in a plane perpendicular to the direction of said channels, are all identical or are different according to whether a channel is an inlet channel or an outlet channel.

The invention further relates to a filter body intended for a particulate filter, and comprising at least one filter block according to the invention.

BRIEF DESCRIPTION OF THE DRAWINGS

The description that follows, provided with reference to the drawings appended hereto, will allow a better understanding and appreciation of the advantages of the invention. In these drawings:

FIG. 1 shows a particulate filter of the prior art, in a transverse cross section along the cutting plane B-B shown in FIG. 2;

FIG. 2 shows the same particulate filter, in a longitudinal cross section along the cutting plane A-A shown in FIG. 1;

FIG. 3 shows a view of the upstream side 7 of a filter block according to the preferred embodiment of the invention.

In these figures, which are nonlimiting, the various components (walls, seals, filter blocks, plugs) are not necessarily shown at the same scale. Identical numerals have been used in the various figures to designate identical or similar elements.

DETAILED DESCRIPTION OF THE INVENTION

FIGS. 1 and 2 having been described in the introduction, we shall now refer to FIG. 3.

The plugs $20s$ of the outlet channels $13s$ are shown cross-hatched.

A distinction is made between the internal channels 25 and the peripheral channels 27.

The internal channels 25 have a square transverse cross section, that is, in a plane perpendicular to the direction C-C of the channels, each side of the section having a length $L_p$. The internal channels 25 terminate outwardly in openings having an area $O_i$. The four sides $25a$, $25b$, $25c$ and $25d$ of the side wall $17_i$ of an inlet or outlet internal channel 25 are each adjacent to an outlet or inlet internal channel, respectively. The area $F_i$ of the filtration zone of the side wall $17_i$ is hence formed by the four sides $25a$-$25d$, and is thus substantially equal to the area $P_i$ of this wall. Thus $F_i/P_i \cong 1$.

The peripheral channels 27 comprise at least one side adjacent to the exterior of the block. Among the peripheral channels 27, a distinction is made between the corner channels 27' and the side channels 27". The corner channels 27' extend along the longitudinal edges 29 of the filter block. The side channels 27", unlike the corner channels 27', are positioned along a single external side 31 of the filter block. The corner 27' and side 27" peripheral channels terminate outwardly in openings having areas $O_p{'}$ and $O_p{''}$, respectively.

The corner channels 27' have a square cross section, each side having a length $l_p$. The side channels 27" have a rectangular cross section, the length of the small side being equal to $l_p$, and the length of the large side being equal to $L_p$.

The side walls of the corner channels 27' and of the side channels 27" have respective areas $P_p{'}=L.4.l_p$ and $p_p{''}=L.(2.l_p+2.L_p)$. They comprise two sides, $27_a{'}$ and $27_b{'}$, and one side $27_a{''}$, respectively, adjacent to the exterior of the filter block, the other sides $27_c{'}$ and $27_d{'}$, and $27_b{''}$, $27_c{''}$ and $27_d{''}$, respectively, being adjacent to other channels.

As described in the introduction, the filter blocks $11a$-$11i$ are joined to one another by a cement seal 12 substantially gastight to the exhaust gases to be filtered. The peripheral channels 27 of the external filter blocks $11a$-$11h$ of the filter body 3 adjacent to the housing 5 are isolated from the exterior by the material 12' gastight to the exhaust gases.

The external sides $27_a{'}$ and $27_b{'}$ on the one hand, and $27_a{''}$ on the other, in contact with the seal 12, or the gastight material 12' hence prevent the passage of the gases to be filtered and are nonfiltering zones of the side walls of the channels 27' and 27", respectively. The filtration zones of the side walls of the channels 27' and 27" therefore have areas $F_p{'}$ and $F_p{''}$, respectively, formed by the other sides $27_c{'}$ and $27_d{'}$, and $27_b{''}$, $27_c{''}$ and $27_d{''}$, respectively, and therefore equal to $L.2.l_p$ and $L.(L_p+2.l_p)$, respectively.

Let us consider a group of channels comprising at least two channels of which the respective F/P ratios between the filtration zone area F and the wall area P are different, for example, a group of channels comprising an internal channel 25, a corner peripheral channel 27' and a side peripheral channel 27".

$$F_p{'}/P_p{'} \neq F_p{''}/P_p{''} \neq F_i/P_i$$

According to the invention, a channel of said group of channels has an opening whose area O is larger, the larger the area F of said filtration zone of said channel. Since $F_p{'}<F_p{''}<F_i$, we therefore have $O_p{'}<O_p{''}<O_i$.

Preferably, every channel of said group is conformed so that $$0.9*R_{threshold}<O/F<1.1*R_{threshold}, \quad (I)$$

where $R_{threshold}$ is a threshold value, preferably further so that $$O/F=R_{threshold}. \quad (II)$$

Thus, in a preferred embodiment of the invention, $R_{threshold}=O_p{'}/F_p{'}=O_p{''}/F_p{''}=O_i/F_i$. In other words, $R_{threshold}=l_p.l_p/(L.2.l_p)=l_p.L_p/(L.(L_p+2.l_p))=L_p.L_p/(L.4.L_p)$, leading to $l_p=0.5.L_p$.

Hence, $O_p{'}=l_p.l_p=0.25.L_p.L_p=0.25.O_i$, and $O_p{''}=L_p.l_p=0.5.L_p.L_p=0.5.O_i$ According to the invention, the $O_p{'}/O_i$ ratio is hence preferably between 0.2 and 0.3, preferably substantially equal to 0.25, and the $O_p{''}/O_i$ ratio is between 0.4 and 0.6, preferably substantially equal to 0.5.

It is assumed that the stream of gas to be filtered arrives at a substantially uniform velocity at the upstream side 7 of the filter block shown in FIGS. 1, 2 and 3.

The cross section of the channels of the filter blocks according to the prior art (FIGS. 1 and 2) is adapted to optimize the compromise between size and pressure drop during the passage of the gases entering and exiting via the internal channels 25. In other words, the internal channels 25, particularly their openings, are conformed so that the pressure drop during the filtration of the gas is lower than but close to a permissible limit pressure drop.

According to the prior art, the inlet and outlet peripheral channels generally have identical openings to those of the inlet internal channels, but lower filtration zone areas. The filtration zones of the inlet peripheral channels hence do not suffice to filter all the gas arriving at the openings of the peripheral channels, thereby causing an overpressure upstream of these openings and a detrimental pressure drop. Moreover, the outlet peripheral channels, receiving less filtered gas than the internal channels, have oversized openings.

According to the invention, the area of the openings of the peripheral channels is reduced to take account of the fact that the filtration zone, which does not cover the entire area of their side wall, is itself reduced in comparison with that of the internal channels.

The flow rate of gas entering or exiting a channel being substantially proportional to the area of the opening of this channel and the area of this opening being adapted to the filtration zone of the channel, the invention makes the gas velocities uniform in the various channels. The pressure drop caused by the filter is therefore reduced.

The adjustment of the openings of the peripheral channels results in a gain in volume which can be exploited by adding additional internal channels. At equivalent size, a filter block according to the invention hence gives rise to a lower pressure drop than that caused by a filter block of the prior art. At identical pressure drop, a filter block according to the invention is more compact than a filter block of the prior art.

Generally, the incident gas stream is not uniform, and in particular, the pressure of the incident gas is different depending on the location of the channel concerned in a filter block and depending on the location of the filter block within the filter body.

In this situation, it is therefore advisable to apply the formulas (I) and (II) only to a group of channels limited to channels of which the openings are crossed by gas streams arriving with substantially identical composition and/or pressure. Preferably, the group of channels is therefore limited to channels terminating near one another.

Preferably, the $O_p/F_p$ ratio of a peripheral channel is such that $$0.9*O'_i/F'_i < O_p/F_p < 1.1*O'_i/F'_i, \quad (III)$$

where $O'_i$ denotes the area of the opening of an internal channel adjacent to said peripheral channel, $F'_i$ is the area of the filtration zone of said internal channel. Preferably, said adjacent internal channel is a channel of the same type as said peripheral channel.

Obviously, the present invention is not limited to the embodiments described and shown above, which are provided for illustration and are nonlimiting.

Thus, the invention further relates to a monolithic filter body. The filter block could have any shape whatsoever.

The cross section of the channels is not limited to the square shape. The cross section of the inlet channels could also be different from that of the outlet channels. The general shape of the cross sections of the peripheral channels could further be different from that of the cross sections of the internal channels. The transverse cross section of a channel could also vary periodically or not, along this channel.

Finally, the opening of a channel could also not be plane or could not be perpendicular to the axis of the channel.

The invention claimed is:

1. Filter block for the filtration of particles present in the exhaust gases of an internal combustion engine, comprising a group of flow channels for said gases, a channel of said group of channels having an opening toward the outside whose area is larger, the larger the filtration zone area of said channel, said group comprising at least a first and a second channels bounded by walls which areas are $P_i$ and $P_p$, respectively, provided with filtration zones which areas are $F_i$ and $F_p$, respectively, so that $F_p/P_p$ is different than $F_p/P_p$, said first and second channels terminating outwardly in openings $O_i$ and $O_p$, respectively, wherein, for any of said first and second channels of said group, $$0.9*O_i/F_i < O_p/F_p < 1.1*O_i/F_i. \quad (I)$$

2. Filter block according to claim 1, wherein $$O_i/F_i = O_p/F_p. \quad (II)$$

3. Filter block according to claim 1, wherein the first and second channels are internal and peripheral channels, respectively.

4. Filter block according to claim 1, wherein said group only comprises channels terminating near one another.

5. Filter block according to claim 1, wherein said group only comprises inlet channels, or only outlet channels for said gases.

6. Filter block according to claim 1, wherein said group comprises all the channels of said filter block.

7. Filter block according to claim 1, said channels of said filter block being substantially parallel, adjacent to one another, and being classifiable as "peripheral" channels and "internal" channels according to whether they do or do not comprise, respectively, a non filtering zone exposed toward the outside of said filter block, wherein the $O_p/O_i$ ratio of the area $O_p$ of the opening (20e,20s) of a peripheral channel to the area $O_i$ of the opening of an internal channel adjacent to it is between 0.2 and 0.75.

8. Filter block according to claim 7, wherein said $O_p/O_i$ ratio is between 0.2 and 0.3.

9. Filter block according to claim 7, wherein said peripheral channel is a corner channel.

10. Filter block according to claim 7, wherein said $O_p/O_i$ ratio is between 0.4 and 0.6.

11. Filter block according to claim 7, wherein said peripheral channel is a lateral peripheral channel.

12. Filter block according to claim 1, wherein the cross sections of said inlet and/or outlet internal channels, in a plane perpendicular to the direction of said channels, are all identical.

13. Filter block according to claim 1, wherein the cross sections of said internal channels, in a plane perpendicular to the direction of said channels, are different according to whether a channel is an inlet channel or an outlet channel.

14. Filter body suitable for a particulate filter, wherein it comprises a plurality of filter blocks according to claim 1.

15. Filter body suitable for a particulate filter, wherein it comprises a plurality of filter blocks according to claim 2.

16. Filter body suitable for a particulate filter, wherein it comprises a plurality of filter blocks according to claim 3.

17. Filter body suitable for a particulate filter, wherein it comprises a plurality of filter blocks according to claim 4.

18. Filter body suitable for a particulate filter, wherein it comprises a plurality of filter blocks according to claim 5.

19. Filter body suitable for a particulate filter, wherein it comprises a plurality of filter blocks according to claim 6.

20. Filter body suitable for a particulate filter, wherein it comprises a plurality of filter blocks according to claim 7.

21. Filter block according to claim 1, which is substantially rectangular parallelepipedal.

22. Filter block according to claim 9, wherein said corner channel has a square cross section.

23. Filter block for the filtration of particles present in the exhaust gases of an internal combustion engine, comprising a group of flow channels for said gases, a channel of said group of channels having an opening toward the outside whose area is larger, the larger the filtration zone area of said channel, said group comprising at least a first and a second channels bounded by walls which areas are $P_i$ and $P_p$, respectively, provided with filtration zones which areas are $F_i$ and $F_p$, respectively, so that $F_p/P_p$ is different than $F_i/P_i$, said first and second channels terminating outwardly in openings $O_i$ and $O_p$, respectively, wherein, for any of said first and second channels of said group, $$0.9*O_i/F_i < O_p/F_p < 1.1*O_i/F_i, \tag{I}$$

said filter block being substantially rectangular parallelepipedal.

* * * * *